United States Patent
Aggarwal et al.

(10) Patent No.: US 11,748,570 B2
(45) Date of Patent: Sep. 5, 2023

(54) AUTOMATED COSTUME DESIGN FROM DYNAMIC VISUAL MEDIA

(71) Applicant: International Business Machines Corporation, Armonk, NY (US)

(72) Inventors: Nupur Aggarwal, Bangalore (IN); Sumanta Mukherjee, Bangalore (IN); Padmanabha Venkatagiri Seshadri, Mysore (IN); Abhishek Bansal, New Delhi (IN); Satyam Dwivedi, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 410 days.

(21) Appl. No.: 16/842,155

(22) Filed: Apr. 7, 2020

(65) Prior Publication Data

US 2021/0312532 A1   Oct. 7, 2021

(51) Int. Cl.
G06F 40/30   (2020.01)
G06F 40/216   (2020.01)

(52) U.S. Cl.
CPC ............ *G06F 40/30* (2020.01); *G06F 40/216* (2020.01)

(58) Field of Classification Search
CPC ............................... G06F 40/30; G06F 40/216
See application file for complete search history.

(56) References Cited

U.S. PATENT DOCUMENTS 8,140,460 B2   3/2012 Miyazaki et al.
8,249,941 B2   8/2012 Saul et al.
(Continued)

FOREIGN PATENT DOCUMENTS

CN   107688717 A   2/2018

OTHER PUBLICATIONS

Zhu et al. "Be your own prada: Fashion synthesis with structural coherence." Proceedings of the IEEE international conference on computer vision. 2017 (Year: 2017).*
(Continued)

*Primary Examiner* — Pierre Louis Desir
*Assistant Examiner* — Keisha Y. Castillo-Torres
(74) *Attorney, Agent, or Firm* — FERENCE & ASSOCIATES LLC (57) ABSTRACT

One embodiment provides a method, including: accessing, at an information handling device, a dynamic visual media corpus, wherein the dynamic visual media corpus comprises a plurality of dynamic visual media scripts; segmenting each of the plurality of dynamic visual media scripts into scenes; generating, for each of the plurality of dynamic visual media scripts, a character fingerprint identifying topics corresponding to each character within a corresponding dynamic visual media script, wherein the generating comprises (i) extracting both characters and topics from the dynamic visual media script and (ii) associating each of the topics with a corresponding character, wherein the character fingerprint identifies costumes of a given character and a topic corresponding to each costume; and producing, for each scene within each dynamic visual media script, a scene vector identifying (iii) the topics included within a corresponding scene and (iv) a character fingerprint for each character occurring within the scene.

10 Claims, 4 Drawing Sheets

(56) References Cited

U.S. PATENT DOCUMENTS

| | | | | |
|---|---|---|---|---|
| 9,478,059 | B2* | 10/2016 | Terry | G06T 13/40 |
| 10,427,046 | B2 | 10/2019 | Garbut et al. | |
| 2007/0156748 | A1* | 7/2007 | Emam | G06F 16/93 |
| | | | | 707/E17.127 |
| 2012/0303643 | A1* | 11/2012 | Lau | G06F 40/45 |
| | | | | 707/756 |
| 2015/0026084 | A1* | 1/2015 | Guo | G06Q 30/0631 |
| | | | | 705/319 |
| 2015/0067569 | A1* | 3/2015 | Brereton | G06N 5/02 |
| | | | | 715/772 |
| 2016/0117311 | A1* | 4/2016 | Maetz | G06F 40/35 |
| | | | | 704/9 |
| 2020/0097502 | A1* | 3/2020 | Trim | G06F 16/7834 |
| 2020/0311798 | A1* | 10/2020 | Forsyth | G06Q 30/0631 |

OTHER PUBLICATIONS

Michael Falkenthal et al., "Pattern Research in the Digital Humanities: How Data Mining Techniques Support the Identification of Costume Patterns", Institute of Architecture of Application Systems, 2016, 12 pages, Springer-Verlag.

Wang-Cheng Kang et al., "Visually-Aware Fashion Recommendation and Design with Generative Image Models", Nov. 7, 2017, 10 pages, arXiv:1711.02231v1 [cs.CV].

Author Unknown, "Fashin", Product, Website: https://fashin.in/, Accessed on Mar. 30, 2020, 5 pages.

Shizhan Zhu et al., "Be Your Own Prada: Fashion Synthesis with Structural Coherence", 2017, 9 pages, Computer Vision Foundation, Copy available at: http://openaccess.thecvf.com/content_ICCV_2017/papers/Zhu_Be_Your_Own_ICCV_2017_paper.pdf.

Lap-Fai Yu et al., "DressUp! Outfit Synthesis Through Automatic Optimization", ACM Transactions on Graphics, vol. 31, No. 6, Article 134, Nov. 2012, 14 pages, RightsLink.

Xintong Han et al., "Learning Fashion Compatibility with Bidirectional LSTMs", Jul. 18, 2017, 9 pages, arXiv:1707.05691v1 [cs.CV].

G. Evangelopoulos et al., "Movie Summarization Based on Audiovisual Saliency Detection", Proceedings of the IEEE International Conference Image Processing (ICIP-2008), Oct. 12-15, 2008, San Diego, CA, US, 4 pages, IEEE Digital Library.

Lei Ding et al., "Learning Relations Among Movie Characters: A Social Network Perspective", Sep. 2010, 15 pages, ResearchGate.

Min Xu et al., "Affective Content Analysis in Comedy and Horror Videos by Audio Emotional Event Detection", Jan. 2005, 5 pages, Research Gate.

* cited by examiner

AUTOMATED COSTUME DESIGN FROM DYNAMIC VISUAL MEDIA

BACKGROUND

In dynamic visual media (e.g., a movie, a play, a musical, an advertisement, television shows, etc.), the way a character is portrayed can be the swaying factor for a viewer when buying into a performance. A large part of the way the character is portrayed is the costume(s) that are worn by the character. For example, if an actor is playing the part of a king then you might expect the actor to be wearing a crown and high-quality, vibrant clothing, not basketball shorts and a t-shirt. If the king was wearing unexpected clothing, the viewer may have a hard time thinking of the actor as the king. Thus, costume selection is very important for correctly conveying a story within the visual media. However, costume design can be an extensive process.

In longer dynamic visual media projects (e.g., movies, television shows), a character will normally undergo one or more costume changes, as the costumes are routinely dependent on the scene within the script. Therefore, multiple costumes must be available for a character and the costumes must also be appropriate for the scene the character is in. To continue the previous example, the attire that an actor playing a king might wear in a scene while addressing the kingdom should be different than the attire that the king is wearing in a scene while in the palace. As a dynamic visual media project grows and more actors and scenes are included in the project, the amount of costumes necessary for the project can quickly increase. Generating the costumes for a variety of different characters within a plurality of scenes is time consuming, and can also result in inappropriate costumes if a single variable is missed during the generation process.

BRIEF SUMMARY

In summary, one aspect of the invention provides a method for training a machine-learning model used to provide recommendations for costumes for characters within a dynamic visual media, the method comprising: accessing, at an information handling device, a dynamic visual media corpus, wherein the dynamic visual media corpus comprises a plurality of dynamic visual media scripts; segmenting each of the plurality of dynamic visual media scripts into scenes; generating, for each of the plurality of dynamic visual media scripts, a character fingerprint identifying topics corresponding to each character within a corresponding dynamic visual media script, wherein the generating comprises (i) extracting both characters and topics from the dynamic visual media script and (ii) associating each of the topics with a corresponding character, wherein the character fingerprint identifies costumes of a given character and a topic corresponding to each costume; and producing, for each scene within each dynamic visual media script, a scene vector identifying (iii) the topics included within a corresponding scene and (iv) a character fingerprint for each character occurring within the scene.

Another aspect of the invention provides an apparatus for training a machine-learning model used to provide recommendations for costumes for characters within a dynamic visual media, the apparatus comprising: at least one processor; and a computer readable storage medium having computer readable program code embodied therewith and executable by the at least one processor, the computer readable program code comprising: computer readable program code configured to access, at an information handling device, a dynamic visual media corpus, wherein the dynamic visual media corpus comprises a plurality of dynamic visual media scripts; computer readable program code configured to segment each of a plurality of dynamic visual scripts into scenes; computer readable program code configured to generate, for each of the plurality of dynamic visual media scripts, a character fingerprint identifying topics corresponding to each character within a corresponding dynamic visual media script, wherein the generating comprises (i) extracting both characters and topics from the dynamic visual media script and (ii) associating each of the topics with a corresponding character, wherein the character fingerprint identifies costumes of a given character and a topic corresponding to each costume; and computer readable program code configured to produce, for each scene within each dynamic visual media script, a scene vector identifying (iii) the topics included within a corresponding scene and (iv) a character fingerprint for each character occurring within the scene.

An additional aspect of the invention provides a computer program product for training a machine-learning model used to provide recommendations for costumes for characters within a dynamic visual media, the computer program product comprising: a computer readable storage medium having computer readable program code embodied therewith, the computer readable program code executable by a processor comprising: computer readable program code configured to access, at an information handling device, a dynamic visual media corpus, wherein the dynamic visual media corpus comprises a plurality of dynamic visual media scripts; computer readable program code configured to segment each of a plurality of dynamic visual scripts into scenes; computer readable program code configured to generate, for each of the plurality of dynamic visual media scripts, a character fingerprint identifying topics corresponding to each character within a corresponding dynamic visual media script, wherein the generating comprises (i) extracting both characters and topics from the dynamic visual media script and (ii) associating each of the topics with a corresponding character, wherein the character fingerprint identifies costumes of a given character and a topic corresponding to each costume; and computer readable program code configured to produce, for each scene within each dynamic visual media script, a scene vector identifying (iii) the topics included within a corresponding scene and (iv) a character fingerprint for each character occurring within the scene.

A further aspect of the invention provides a method, comprising: receiving a movie script; segmenting the received movie script into scenes; generating a character fingerprint for each character within the received movie script, wherein each of the character fingerprints for a character identifies (i) topics corresponding to the character within the movie script and (ii) costumes of the character related to each topic; producing a scene vector for each scene within the received movie script, wherein each of the scene vectors comprises (iii) topics within a scene and (iv) character fingerprints for each character within the scene; and providing at least one recommendation for a costume within the received movie script utilizing a trained machine-learning model, wherein the machine-learning model is trained utilizing a movie corpus that, for each movie script within the corpus, is (i) segmented into scenes, (ii) has a character fingerprint generated for each character, and (iii) has scene vectors produced for each scene within the movie script; the providing at least one recommendation comprising applying a conditional generative adversarial network to each scene vector of the received movie script against the scene vectors of the machine-learning model, thereby generating one or more costumes for the movie scene.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-4. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an example embodiment, most if not all of the process steps, components and outputs discussed with respect to FIGS. 1-3 can be performed or utilized by way of a processing unit or units and system memory such as those indicated, respectively, at 16' and 28' in FIG. 4, whether on a server computer, a client computer, a node computer in a distributed network, or any combination thereof.

Conventional techniques for determining the costume for a character are limited and are manual in nature. Traditionally, a costume is selected with the help of a department affiliated with a project, which will manually put together costumes for characters for different scenes. To determine the most appropriate costumes, the people within the department generally will read the script, or at least a portion of a script for example, the portion associated with a target scene, identify the context or feel of the scene, and then brainstorm costume ideas. The people may draw inspiration for costumes from previous movies or scripts having a theme similar to the target script, historical events, real life experiences, or the like. For example, if the setting of a movie scene is a character within the setting of a 1980s Halloween party, the department might select a Halloween costume from a popular 1980s movie. Alternatively, a person within the department could have been around during that time period and remember people wearing such costumes, or a person within the department could have seen a separate movie based around the same time which included characters wearing similar costumes. However, this manual technique for selecting a costume for a character is dated and very time consuming.

Another traditional technique uses a similar concept, in which people within a department extract ideas from a script and any additional movie information (e.g., setting information, character background information). Input is accepted manually and is provided by a user who describes a character and the context of the character, and then generates a costume based on these characteristics. The system then accesses a database or other information storage location that includes information related to costumes generated previously for dynamic visual media projects. Within the database the costume information is associated with key terms. Thus, with the input provided by the user, the system can search the key terms and provide identification of costumes that match the key terms. This technique can assist a user by identifying previously used costumes for a character within a particular context. However, the need to manually input information related to the character is still very time consuming and can lead to inaccurate costume generation if information is input incorrectly. Additionally, this system does not generate unique costumes but, rather, provides identification of previous costumes that match the search terms.

Thus, the described system and method allow for an automated technique for generating costume recommendations for characters within a dynamic visual media (e.g., play, musical, movie, advertisement, television show, etc.) utilizing a machine-learning model trained with a visual media script corpus. The described system and method may generate character costumes from a conditional generative adversarial network that leverages information included in a target dynamic visual media script. The system additionally uses the context surrounding the characters within the script to generate and recommend character costumes. To make the recommendation, a system may utilize a corpus of dynamic visual media scripts to train a machine-learning model. The machine-learning model may be trained to recognize traits within a corpus of movie scripts and additional text analysis to make costume recommendations.

Dynamic visual media projects may be short and require a single costume or may be longer and require multiple costumes to accurately depict a character. Thus, the segmentation and analysis of scenes within a dynamic visual media script may assist in determining the costumes necessary for each character present in the scene. Additionally, the segmentation of scenes may identify a starting and stopping point for when a character should be in a certain costume. To make the recommendation, the system may generate character fingerprints for the characters within a scene. The character fingerprint may identify topics present within a scene and corresponding to a character within the dynamic visual media project. Additionally, for each scene within the project, a scene vector is produced that identifies and relates the topics present in a scene with the character fingerprints of each character in the scene. The character fingerprint may be produced or generated for the entire script and, therefore, each scene character fingerprint may be different from the script character fingerprint.

Such a system provides a technical improvement over current systems for generating character costumes for a dynamic visual media project. Rather than relying on people within a costume department to manually determine what information surrounding a character within a scene is important in producing a costume for a character, the system provides an automated system for recognizing information present in the dynamic visual media script to produce a costume for a character within a scene. Thus, instead of the time extensive and potentially inaccurate conventional techniques that result in poor costume choices for a dynamic visual media project, the described technique is more efficient and results in more accurate costume generation and recommendation. Additionally, the described technique utilizes an encoding store that includes a database of movie script corpus which may be updated regularly. Since the encoding store can be dynamically updated, the most accurate and up-to-date costumes may be produced and utilized by characters in a dynamic visual media scene.

Figure 1:
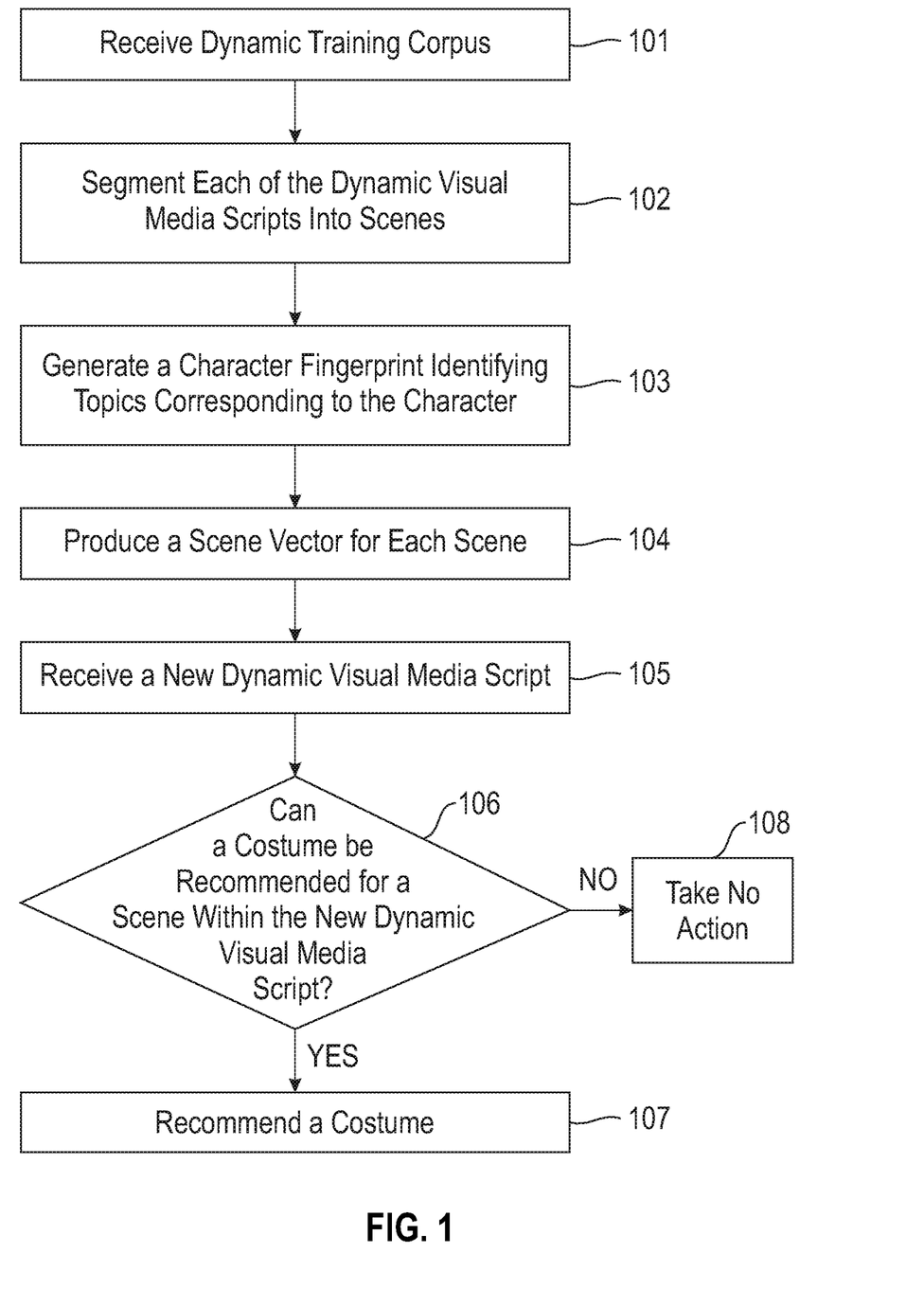
FIG. 1 illustrates a method of training a machine-learning model utilizing a visual media script corpus to provide recommendation for costumes within a dynamic visual media.

FIG. 1 provides a method for training a machine-learning model utilizing a visual media script corpus to provide recommendations for costumes within a dynamic visual media, also referred to as a target dynamic visual media. For ease of readability, a movie type of dynamic visual media will be used as the example throughout. However, the system can be utilized with any dynamic visual media, for example, a play, musical, television show, advertisement, movie, commercials, short films, or the like. The system can also be utilized with static visual media (e.g., a still advertisement, etc.), but costumes for this type of media are usually selected for the purpose of the static media and may not receive as much benefit from the described system and method as dynamic visual media.

At 101 a system may receive a dynamic visual media corpus. A dynamic media corpus may include a plurality of dynamic visual media scripts that correspond to a dynamic visual media project. The corpus may also include any additional information related to a script that is necessary to understanding a dynamic visual media project, for example, setting, time period, number of characters, plot summary, names of actors, directors, or other people involved in the project, or the like. Even if the target dynamic media project is a particular media type, for example, a movie, the media corpus can include media scripts from all types of media, for example, plays, advertisements, movies, musicals, television shows, or the like. The dynamic visual media corpus utilized by the system may be updated over time as more dynamic visual media scripts are created. By continually providing newer dynamic visual media scripts to the system and updating the dynamic media corpus, accuracy when generating a recommendation for a costume for a character will increase.

After receipt of the dynamic visual media corpus, a system may segment the plurality of scripts present in the corpus into scenes at 102. It should be understood that depending on the length or type of visual media, multiple, different scenes may not be present within the dynamic visual media project. Thus, in such a case, the segmenting may include identifying a single scene segment. Based upon the segmenting, the system may group the information related to each scene together. In other words, the information present in a scene is segmented and associated with a specific time frame within the dynamic visual media project. The segmenting ensures that costume context relations may be enclosed within semantic boundaries. In other words, the system attempts to group costumes with corresponding context within a single scene so that the context of the costume within the scene can be identified. Thus, the segmenting includes maintaining costumes and corresponding context for the costumes within a single scene segment by utilizing one or more scene segmentation techniques to enclose semantic boundaries of the scene.

Segmenting the project into scenes may be performed utilizing semantic boundaries that are identified using a variety of techniques, for example, natural language processing techniques, scene identification techniques (e.g., context change identification, scene transition identification, etc.), text analysis, and the like. The semantic boundaries may provide a system with a starting and ending point for the use of a potential character costume. However, it should be understood that costumes are not necessarily the underlying basis for determining a scene boundary, as costumes may be used throughout multiple segmented scenes. The dialog associated with the scene, either in audible form or textual form, may be extracted in a textual format and used to form or generate a textual script associated with the scene. The script may also be utilized in determining a scene boundary as other techniques can be utilized on the textual script, for example, semantic analysis, syntactic analysis, parts-of-speech identifiers, annotation, information extraction, and the like.

For each of the plurality of dynamic visual media scripts and scenes within the script a character fingerprint is generated at 103. A character fingerprint may identify topics corresponding to the character within a scene of the dynamic visual media script. Thus, the character fingerprint may be generated for each scene and includes the topics corresponding to the scene. When generating the character fingerprint, a system may extract characters and topics from scenes of the dynamic visual media script and further associate the topics with the corresponding characters. Thus, to generate the character fingerprint the system, once a dynamic visual media script is segmented into scenes, may identify and extract topics associated with or corresponding to each scene. Extracting topics may be performed utilizing one or more topic extraction techniques, for example, annotator, information extractors, summarizers, or the like.

Once the topics are extracted, the system may generate a topic relation graph for the entire corpus. The topic relation graph may be utilized to determine or identify scenes that are similar between dynamic visual scripts within the corpus. Within the topic relation graph, topics may be represented as nodes. Further, relationships between topics may be represented as edges of the graph. Depending on the frequency of related topics, the edges for each graph are weighted and may be weighted differently based upon the topic co-occurrence frequency. In other words, the edges between nodes may be labelled with the co-occurrence frequency of connected topics. In addition to extracting topics, the system also identifies costumes that are utilized by the characters within each scene. Thus, the system can make a correlation between costumes and topics. Accordingly, the character fingerprint, which is based upon this information and identifies the topics corresponding to the character, also identifies costumes of the characters occurring within a scene and associated with the topic(s) of the scene. The character fingerprint can also be generated using the textual scripts.

For each dynamic visual media script, the characters may be extracted and the topics associated with each character within each scene may be presented as a vector, thereby producing a script-level character fingerprint. Accordingly, at 104, a scene vector may be produced for each scene within a script. In other words, a scene vector is generated for each scene within each script of the corpus. The scene vector identifies the topics included within a scene and includes the character fingerprints for those characters occurring in the scene. The scene vector may be produced utilizing or based upon the information within the topic relationship graph. By producing a vector within the limited temporal space of a scene, the system may provide a scene vector that contains temporal information. A sliding window can be applied to a scene that has a particular temporal window size. The system can then generate a character fingerprint for the temporal window size. This allows for identification of how a character acts throughout a scene and different topics that may be included within a single scene.

In generating the scene vector, an embodiment may also utilize the textual script for each scene. Generation of the scene vector may utilize the textual script to assist in determining the topics and characters present in the scene. Producing a scene vector allows for maintaining the relationship between the topics included within a corresponding scene and the character fingerprints for the characters present in the scene or temporal window. The system may generate a scene vector, or temporal window vector, for each script included in the corpus that describes or identifies the topics, characters, dialog, and costumes present in each scene. Thus, the scene vector can provide context for costumes used by characters within a scene. Accordingly, each scene can be encoded with a topic encoding vector using the topic relation graph, character fingerprints, and scene vectors.

The topic encoding vector may take into account the overall story being portrayed within the dynamic media project. By referencing the dynamic visual media project and accounting for the story being portrayed, a system may take into account the entire story being conveyed within the dynamic media project to produce vectors that ensure consistency for costume generation of a character throughout the dynamic media project. In other words, by taking into account the overall story when producing scene vectors, the system may maintain consistencies in a character's costumes throughout a script. For example, within the story corresponding to a dynamic visual media script, the protagonist may be described or identified as a mysterious character. Thus, the system may take into account these character traits when training the model, and may ensure consistency in the costume recommendations for this character across the dynamic media project, for example, by recommending costumes with dark colors or costumes that conceal some portion of the character, for example a portion of the character's face. After the machine-learning model is trained, character encoding vectors, character encoding vectors within a temporal context, and scene encoding vectors may be produced and provided for use in recommending costumes for a target script.

After the dynamic media corpus is used to train a system by recognizing and producing scene vectors for all dynamic visual media scripts within the corpus, the model can be utilized to generate costume recommendations. The recommendations may be generated based on information within a target scene, information present across an entire script, and identifying similarities between scene vectors present in the encoding store or model and the target script. Thus, the system may receive a new dynamic visual media script, or target script at 105. The system may then determine if a costume recommendation can be made for a scene within the new or target dynamic visual media script at 106.

To make the recommendation the system may, in a similar manner as was performed for training the machine-learning model, segment the target script into scenes. The system may also generate character fingerprints for each character within the target script, or, alternatively, for characters occurring within a particular target scene. Additionally, the system may produce scene vectors for either the target scene(s) or for each scene within the target script. In producing these scene vectors, the system may take into account not only character fingerprints for the target scene, but also character fingerprints for the entire dynamic visual media script. As with the training of the machine-learning model, the result will be character encoding vectors, character encoding vectors within a temporal context, and scene encoding vectors for the target script.

The vectors can be combined into context vectors describing characters, topics, and dialog present in each scene from the target script. Using the context vectors and the encodings from the machine-learning model, the system may determine a costume recommendation for each scene present in the target script. For example, the context vectors for the target script may then be compared against the scene vectors of the encoding store or machine-learning model. The system may apply a conditional generative adversarial network to each scene vector of the target script against the scene vectors of the machine-learning model to generate one or more costume recommendations for the target scene. In other words, correlating scene vectors within the model to the context vectors of the target script may result in recommending costume designs by identifying similarities between the target script and scripts in the corpus and, thereafter, identifying costumes or features of costumes used in the similar scenes.

If the system cannot provide a costume recommendation at 106, the system may take no action or provide a notification to the user that a costume recommendation cannot be made at 108. A situation such as this may occur when the target dynamic visual media script is different from any of the plurality of the dynamic visual media scripts within the corpus and, therefore, no similar scenes can be identified. As another example, the user may provide filters, keywords, or weighting to be utilized when similar scenes or costumes are identified. If the user input is too restrictive, no costume recommendations may be possible because no scene or costume within the corpus fulfills all of the requirements.

If, on the other hand, a costume recommendation can be made, the system may make the recommendation at 107. Making a recommendation may include providing a textual, visual, or other recommendation. The recommendation may also include providing identification of the scenes and costumes that were deemed similar so that the user can identify how the costume recommendation was made. Additionally, multiple costume recommendations may be provided to a user. Additionally or alternatively, the system may not recommend an entire costume but may instead recommend different features from different costumes, for example, a neckline, color, material, or the like. The ability to provide a variety of costume recommendations to a user may result in the use of more accurate costumes for character within a scene and consistency of costumes for a character throughout the dynamic visual media project.

Figure 2:
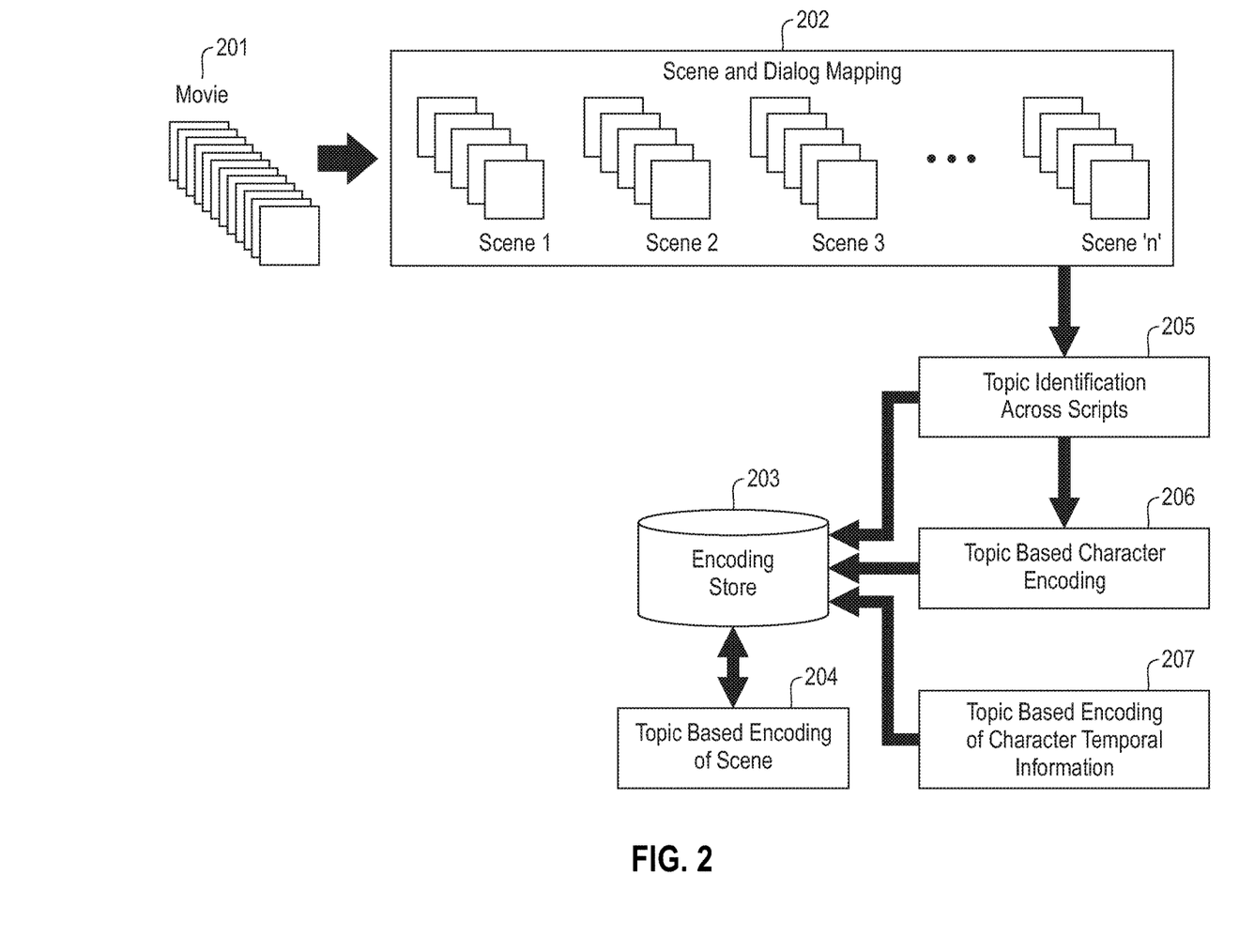
FIG. 2 illustrates an example of training a machine-learning model for costume recommendation.

FIG. 2 illustrates an example system used for training the machine-learning system after receipt of the scripts within the dynamic visual media corpus 201. With the scripts the system may also receive any additional relevant information corresponding to a movie script. The system utilizes a scene and dialog mapping component 202 to segment the dynamic visual media scripts into scenes. The system then utilizes a component for identifying topics across scripts 205, a component for topic based character encoding 206, and a component for topic based encoding of character temporal information 207. The information from the component for identifying topics across scripts 205, a component for topic based character encoding 206, and a component for topic based encoding of character temporal information 207 is into an encoding store 203 or machine-learning model. Additionally, a component for topic based encoding of a scene 204 may be utilized in the training of the encoding store 203 or machine-learning model.

Figure 3:
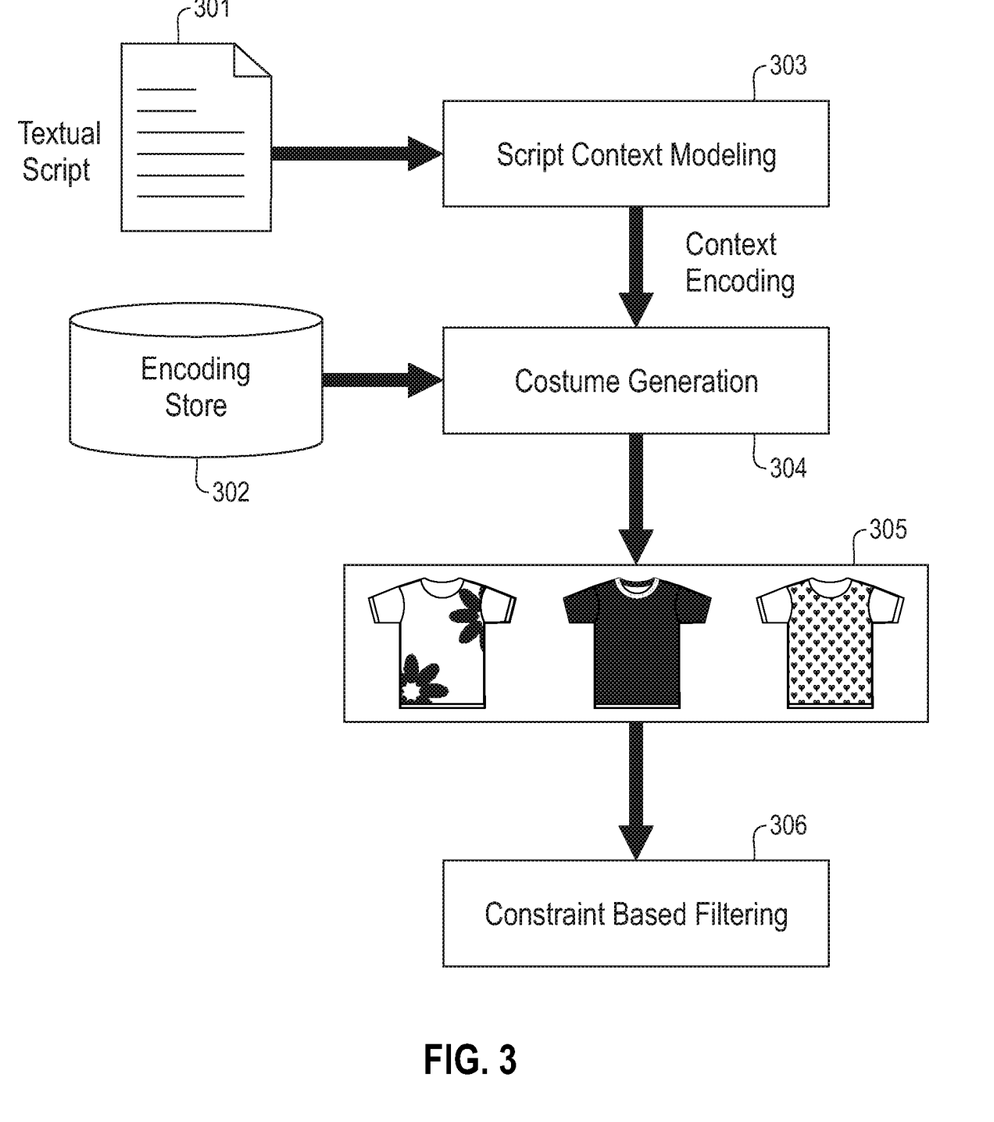
FIG. 3 illustrates an example of generating the costume design recommendations.

FIG. 3 illustrates an example of generating costume recommendations for a new or target dynamic visual media script. The target dynamic visual media script 301 may be modeled using a script context modeling component 303. This component segments the script into scenes, generates character fingerprints, scene vectors, and context vectors. The system then utilizes the context encodings to compare against the encoding store 302 to be utilized by the costume generation component 304. The output of the costume generation component 304 may be recommendations of one or more costumes 305. The user can then provide constraints or filters to be used by the constraint based filtering component 306 in reducing the number of costume recommendations. For example, if a costume is recommended for a character but it is too expensive for the budget of the project, the recommendation may be withheld or removed from the recommendations.

In making a recommendation, a system may attempt to detect costume design infringement. In other words, the system may attempt to prevent the costume from infringing on any intellectual property rights of another costume design or designer. Each article of clothing that is manufactured for potential use when generating a costume may include a watermark or some version of pattern encoding that is shared with a trusted agent. A trusted agent may acquire all metadata associated with a manufactured product and register the information to show ownership of the pieces of a costume that is being made. A new watermark may be used for each article of clothing manufactured. To assure that costume infringement does not occur, each unit of clothing may pass through a pattern extractor to verify the units. This information may then be shared with the trusted agent. The trusted agent may then determine if the units of clothing infringe upon any previous costume watermarks. Based on a pre-determined novelty threshold, a system may determine if the unit of clothing deviates enough to be deemed novel and non-infringing.

Figure 4:
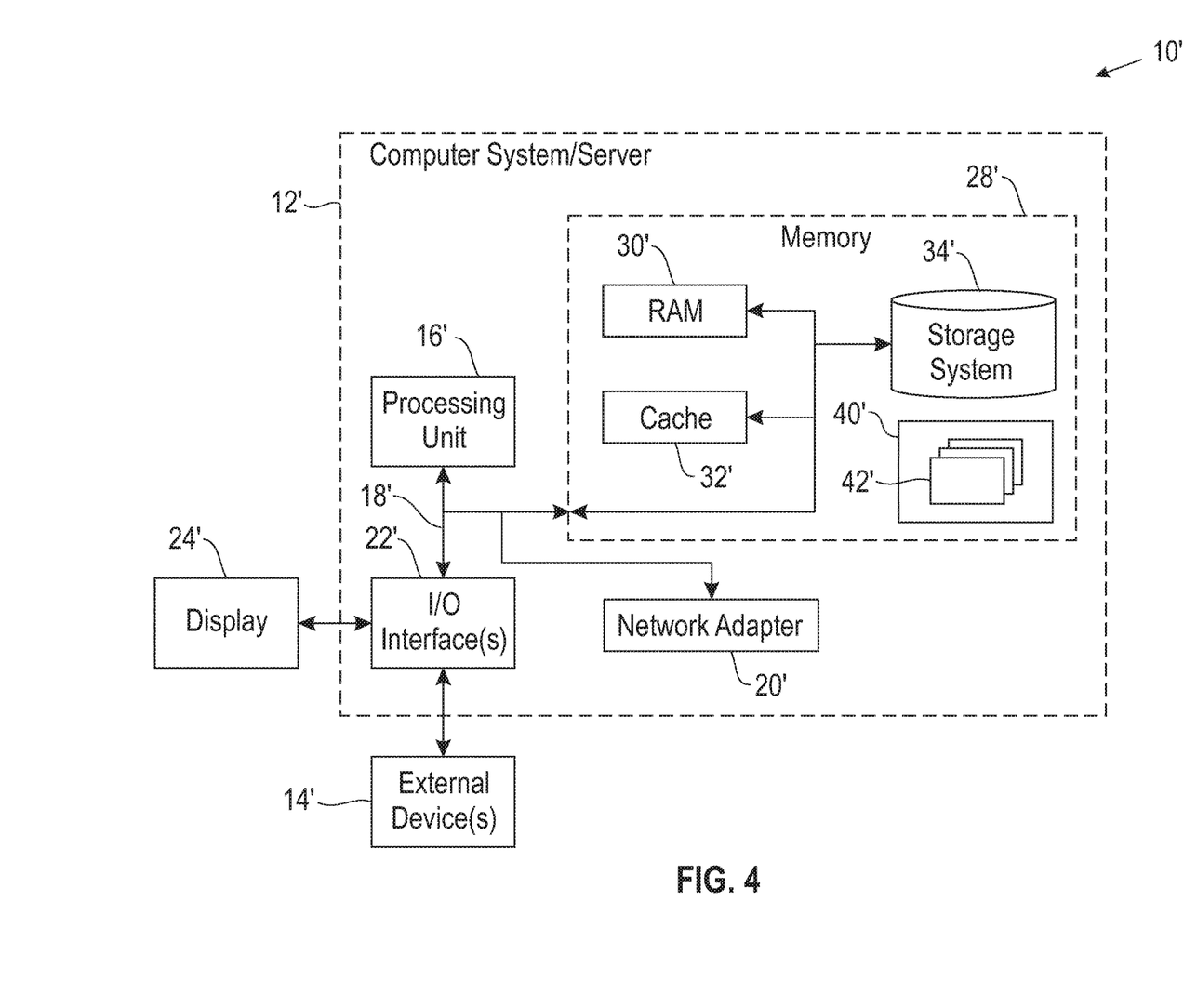
FIG. 4 illustrates a computer system.

As shown in FIG. 4, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for training a machine-learning model used to provide recommendations for costumes for characters within a dynamic visual media, the method comprising:
    receiving a dynamic visual media script for recommendation of at least one costume;
    accessing, at an information handling device, a dynamic visual media corpus, wherein the dynamic visual media corpus comprises a plurality of dynamic visual media scripts;
    segmenting each of the plurality of dynamic visual media scripts into scenes, wherein the segmenting comprises identifying, utilizing at least one scene segmentation technique to enclose semantic boundaries, a segment by identifying a portion of the dynamic visual media script having a costume and corresponding context that are consistent throughout the portion;
    generating, for each of the plurality of dynamic visual media scripts, a character fingerprint identifying topics corresponding to each character within a corresponding dynamic visual media script, wherein the generating comprises (i) extracting both characters and topics from the dynamic visual media script and (ii) associating each of the topics with a corresponding character and comprises generating a topic-relationship graph across the dynamic visual media corpus, wherein the topic-relationship graph represents topics occurring within the plurality of dynamic visual media scripts as nodes and relationships between the topics as edges, wherein the edges are weighted with an occurrence frequency, wherein the character fingerprint identifies costumes of a given character and a topic corresponding to each costume;
    producing, for each scene within each dynamic visual media script, a scene vector identifying (iii) the topics included within a corresponding scene and (iv) a character fingerprint for each character occurring within the scene and training the machine-learning model with the scene vectors;
    encoding, within each scene within each dynamic visual media script, a topic encoding vector using the topic-relationship graph, the character fingerprint, and the scene vector, wherein the topic encoding vector reflects an overall story of the dynamic visual media script and ensures consistency of costume generation of a character throughout the dynamic visual media script; and
    providing, based upon the topic encoding vectors, at least one recommendation for a costume within the received dynamical visual script, wherein the providing at least one recommendation comprises applying a generative adversarial network to each scene vector of the received dynamic visual script against the scene vectors of the machine-learning model, thereby generating one or more costumes for the dynamic visual media scene of the received dynamic visual media script.

2. The method of claim 1, wherein the producing a scene vector comprises utilizing the topic-relationship graph.

3. The method of claim 1, comprising generating a scene-level character fingerprint by applying a time window corresponding to a scene to the dynamic visual media script, wherein the generating is carried out for the applied time window.

4. The method of claim 1, wherein the providing at least one recommendation comprises:
    segmenting the received dynamic visual script;
    generating a character fingerprint for each character within the received dynamic visual script; and
    producing a scene vector for each scene within the received dynamic visual script.

5. The method of claim 1, comprising generating a textual script for each scene corresponding to a dialogue included in a corresponding scene; and
    wherein the generating and the producing are based upon the textual script.

6. An apparatus for training a machine-learning model used to provide recommendations for costumes for characters within a dynamic visual media, the apparatus comprising:
    at least one processor; and
    a computer readable storage medium having computer readable program code embodied therewith and executable by the at least one processor, the computer readable program code comprising:
    computer readable program code configured to receive a dynamic visual media script for recommendation of at least one costume;
    computer readable program code configured to access, at an information handling device, a dynamic visual media corpus, wherein the dynamic visual media corpus comprises a plurality of dynamic visual media scripts;
    computer readable program code configured to segment each of a plurality of dynamic visual scripts into scenes, wherein the computer readable code configured to segment comprises identifying, utilizing at least one scene segmentation technique to enclose semantic boundaries, a segment by identifying a portion of the dynamic visual media script having a costume and corresponding context that are consistent throughout the portion;

computer readable program code configured to generate, for each of the plurality of dynamic visual media scripts, a character fingerprint identifying topics corresponding to each character within a corresponding dynamic visual media script, wherein the generating comprises (i) extracting both characters and topics from the dynamic visual media script and (ii) associating each of the topics with a corresponding character, and comprises generating a topic-relationship graph across the dynamic visual media corpus, wherein the topic-relationship graph represents topics occurring within the plurality of dynamic visual media scripts as nodes and relationships between the topics as edges, wherein the edges are weighted with an occurrence frequency, wherein the character fingerprint identifies costumes of a given character and a topic corresponding to each costume;

computer readable program code configured to produce, for each scene within each dynamic visual media script, a scene vector identifying (iii) the topics included within a corresponding scene and (iv) a character fingerprint for each character occurring within the scene and training the machine-learning model with the scene vectors;

computer readable program code configured to encode, within each scene within each dynamic visual media script, a topic encoding vector using the topic-relationship graph, the character fingerprint, and the scene vector, wherein the topic encoding vector reflects an overall story of the dynamic visual media script and ensures consistency of costume generation of a character throughout the dynamic visual media script; and computer readable program code configured to provide, based upon the topic encoding vectors, at least one recommendation for a costume within the received dynamical visual script, wherein the providing at least one recommendation comprises applying a generative adversarial network to each scene vector of the received dynamic visual script against the scene vectors of the machine-learning model, thereby generating one or more costumes for the dynamic visual media scene of the received dynamic visual media script.

7. A computer program product for training a machine-learning model used to provide recommendations for costumes for characters within a dynamic visual media, the computer program product comprising:

a computer readable storage medium having computer readable program code embodied therewith, the computer readable program code executable by a processor comprising:

computer readable program code configured to receive a dynamic visual media script for recommendation of at least one costume;

computer readable program code configured to access, at an information handling device, a dynamic visual media corpus, wherein the dynamic visual media corpus comprises a plurality of dynamic visual media scripts;

computer readable program code configured to segment each of a plurality of dynamic visual scripts into scenes, wherein the computer readable code configured to segment comprises identifying, utilizing at least one scene segmentation technique to enclose semantic boundaries, a segment by identifying a portion of the dynamic visual media script having a costume and corresponding context that are consistent throughout the portion;

computer readable program code configured to generate, for each of the plurality of dynamic visual media scripts, a character fingerprint identifying topics corresponding to each character within a corresponding dynamic visual media script, wherein the generating comprises (i) extracting both characters and topics from the dynamic visual media script and (ii) associating each of the topics with a corresponding character, and comprises generating a topic-relationship graph across the dynamic visual media corpus, wherein the topic-relationship graph represents topics occurring within the plurality of dynamic visual media scripts as nodes and relationships between the topics as edges, wherein the edges are weighted with an occurrence frequency, wherein the character fingerprint identifies costumes of a given character and a topic corresponding to each costume;

computer readable program code configured to produce, for each scene within each dynamic visual media script, a scene vector identifying (iii) the topics included within a corresponding scene and (iv) a character fingerprint for each character occurring within the scene and training the machine-learning model with the scene vectors;

computer readable program code configured to encode, within each scene within each dynamic visual media script, a topic encoding vector using the topic-relationship graph, the character fingerprint, and the scene vector, wherein the topic encoding vector reflects an overall story of the dynamic visual media script and ensures consistency of costume generation of a character throughout the dynamic visual media script; and computer readable program code configured to provide, based upon the topic encoding vectors, at least one recommendation for a costume within the received dynamical visual script, wherein the providing at least one recommendation comprises applying a generative adversarial network to each scene vector of the received dynamic visual script against the scene vectors of the machine-learning model, thereby generating one or more costumes for the dynamic visual media scene of the received dynamic visual media script.

8. The computer readable program product of claim 7, wherein the producing a scene vector comprises utilizing the topic-relationship graph.

9. The computer readable program product of claim 7, comprising generating a scene-level character fingerprint by applying a time window corresponding to a scene to the dynamic visual media script, wherein the generating is carried out for the applied time window.

10. A method, comprising:

receiving a movie script;

segmenting the received movie script into scenes;

generating a character fingerprint for each character within the received movie script, wherein each of the character fingerprints for a character identifies (i) topics corresponding to the character within the movie script and (ii) costumes of the character related to each topic, wherein the generating comprises generating a topic-relationship graph across the dynamic visual media corpus, wherein the topic-relationship graph represents topics occurring within the plurality of dynamic visual media scripts as nodes and relationships between the topics as edges, wherein the edges are weighted with an occurrence frequency;

producing a scene vector for each scene within the received movie script, wherein each of the scene vectors comprises (iii) topics within a scene and (iv) character fingerprints for each character within the scene;

encoding, within each scene within the received movie script, a topic encoding vector using the topic-relationship graph, the character fingerprint, and the scene vector, wherein the topic encoding vector reflects an overall story of the movie script and ensures consistency of costume generation of a character throughout the movie script; and providing, based upon the topic encoding vectors, at least one recommendation for a costume within the received movie script utilizing a trained machine-learning model, wherein the machine-learning model is trained utilizing a movie corpus that, for each movie script within the corpus, is (i) segmented into scenes utilizing at least one scene segmentation technique to enclose semantic boundaries and by identifying a portion of the movie script having a costume and corresponding context that are consistent throughout the portion, (ii) has a character fingerprint generated for each character, and (iii) has scene vectors produced for each scene within the movie script;

the providing at least one recommendation comprising applying a conditional generative adversarial network to each scene vector of the received movie script against the scene vectors of the machine-learning model, thereby generating one or more costumes for the movie scene.

* * * * *